US010571072B2

(12) United States Patent
Romenesko

(10) Patent No.: US 10,571,072 B2
(45) Date of Patent: Feb. 25, 2020

(54) METHOD OF FORMING A BONDED PACKAGE GUSSET

(71) Applicant: Hudson-Sharp Machine Company, Green Bay, WI (US)

(72) Inventor: Scott Romenesko, Green Bay, WI (US)

(73) Assignee: Hudson-Sharp Machine Company, Green Bay, WI (US)

( * ) Notice: Subject to any disclaimer, the term of this patent is extended or adjusted under 35 U.S.C. 154(b) by 679 days.

(21) Appl. No.: 15/255,956

(22) Filed: Sep. 2, 2016

(65) Prior Publication Data

US 2017/0057192 A1    Mar. 2, 2017

Related U.S. Application Data

(60) Provisional application No. 62/213,449, filed on Sep. 2, 2015.

(51) Int. Cl.
*B65D 75/58* (2006.01)
*B65D 75/00* (2006.01)
(Continued)

(52) U.S. Cl.
CPC ........... *F16M 13/027* (2013.01); *B29C 65/18* (2013.01); *B29C 65/749* (2013.01);
(Continued)

(58) Field of Classification Search
CPC ............... F16M 13/027; B65D 75/008; B31B 2170/20; B31B 70/18; B31B 70/61;
(Continued)

(56) References Cited

U.S. PATENT DOCUMENTS 2,423,187 A  7/1947 Haugh
2,759,524 A  8/1956 Davis
(Continued)

FOREIGN PATENT DOCUMENTS

DE  10 2009 036556 A1  2/2011
GB  2 150 493 A  7/1985
(Continued)

OTHER PUBLICATIONS

Supplementary Partial European Search Report and Provisional Opinion dated Apr. 21, 2017.
(Continued)

*Primary Examiner* — Nathaniel C Chukwurah
*Assistant Examiner* — Mobeen Ahmed
(74) *Attorney, Agent, or Firm* — Wood, Phillips, Katz, Clark & Mortimer

(57) ABSTRACT

The present invention is directed to a method forming a bottom-gusseted package, wherein each package includes an inwardly-extending, pleat-like gusset at the bottom of the package. To permit heat-sealing formation of each package, the sleeve from which each gusset is formed comprises a lamination of two differing polymeric materials, so that only an exterior surface of each sleeve exhibits the desired heat-sealing characteristics. To facilitate package formation, the sleeves from which the bottom gussets are formed are maintained in a temporarily closed or sealed configuration during package formation by providing a preferably frangible bond or seal at the edge of each sleeve. This result is preferably achieved by folding the laminate material, and temporarily sealing or joining an outer layer of the laminate material from which gusset is formed, while an inner layer is maintained in an unsealed condition.

9 Claims, 7 Drawing Sheets

(51) Int. Cl.
  *B65D 30/20* (2006.01)
  *F16M 13/02* (2006.01)
  *B29C 65/00* (2006.01)
  *B29C 65/74* (2006.01)
  *B29C 65/18* (2006.01)
  *B31B 70/26* (2017.01)
  *B31B 160/20* (2017.01)
  *B31B 70/64* (2017.01)
  *B31B 155/00* (2017.01)
  *B31B 70/18* (2017.01)
  *B31B 170/20* (2017.01)
  *B31B 70/60* (2017.01)
  *B29C 65/10* (2006.01)
  *B29C 65/48* (2006.01)
  *B29C 65/16* (2006.01)
  *B29C 65/08* (2006.01)

(52) U.S. Cl.
  CPC ........ *B29C 65/7439* (2013.01); *B29C 66/137* (2013.01); *B29C 66/4322* (2013.01); *B29C 66/723* (2013.01); *B29C 66/73921* (2013.01); *B29C 66/81415* (2013.01); *B29C 66/91933* (2013.01); *B29C 66/91935* (2013.01); *B65D 75/008* (2013.01); *B29C 65/08* (2013.01); *B29C 65/10* (2013.01); *B29C 65/16* (2013.01); *B29C 65/48* (2013.01); *B29C 65/7443* (2013.01); *B29C 65/7473* (2013.01); *B29C 66/1122* (2013.01); *B29C 66/71* (2013.01); *B29C 66/836* (2013.01); *B31B 70/18* (2017.08); *B31B 70/262* (2017.08); *B31B 70/61* (2017.08); *B31B 70/644* (2017.08); *B31B 2155/00* (2017.08); *B31B 2155/003* (2017.08); *B31B 2155/0012* (2017.08); *B31B 2160/20* (2017.08); *B31B 2170/20* (2017.08)

(58) Field of Classification Search
  CPC ................ B31B 70/644; B31B 70/262; B31B 2155/0012; B31B 2155/00; B31B 2155/003; B31B 2160/20; B31B 70/26; B31B 70/64; B31B 70/76; B29C 65/18; B29C 66/91933; B29C 66/73921; B29C 66/137; B29C 66/91935; B29C 66/723; B29C 65/7439; B29C 66/4322; B29C 65/749; B29C 66/81415; B29C 65/08; B29C 66/71; B29C 65/16; B29C 65/48; B29C 65/10; B29C 66/1122; B29C 66/836; B29C 65/7473
  USPC .......................... 493/207–209, 223, 243, 254
  See application file for complete search history.

(56) References Cited

U.S. PATENT DOCUMENTS

| | | | |
|---|---|---|---|
| 2,781,079 A | 2/1957 | Ruby et al. | |
| 2,883,813 A * | 4/1959 | Shannon | B65B 27/10 53/545 |
| 2,987,107 A * | 6/1961 | Sylvester | B65B 51/16 53/273 |
| 3,441,460 A * | 4/1969 | Carmichael | B29C 65/18 156/251 |
| 3,765,990 A * | 10/1973 | Histed | B29C 65/18 156/515 |
| 4,070,022 A | 1/1978 | Olson | |
| 4,211,599 A | 7/1980 | Bolter et al. | |
| 4,259,134 A | 3/1981 | Joice et al. | |
| 4,308,087 A | 12/1981 | Johnson | |
| 4,318,768 A | 3/1982 | Johnson | |
| 4,534,819 A * | 8/1985 | Payet | B29C 65/7443 156/515 |
| 4,687,532 A | 8/1987 | Johnson | |
| 4,721,502 A * | 1/1988 | Herrington | B29C 66/1122 156/583.1 |
| 4,838,977 A * | 6/1989 | Ebmeyer | B31B 70/00 156/252 |
| 4,909,017 A | 3/1990 | McMahon et al. | |
| 5,255,497 A | 10/1993 | Zoromski et al. | |
| 5,444,964 A * | 8/1995 | Hanagata | B29C 65/7439 156/324 |
| 5,545,419 A * | 8/1996 | Brady | B32B 27/32 383/109 |
| 5,826,401 A * | 10/1998 | Bois | B65B 9/20 53/412 |
| 6,024,220 A * | 2/2000 | Smith | B29C 66/24244 206/219 |
| 6,027,596 A * | 2/2000 | DeFriese | B29C 65/7439 156/213 |
| 6,083,584 A * | 7/2000 | Smith | B29C 66/1122 128/DIG. 24 |
| 6,132,351 A * | 10/2000 | Lotto | B65D 33/02 493/210 |
| 6,168,558 B1 * | 1/2001 | Vinberg | B65D 33/002 242/258 |
| 6,290,634 B1 * | 9/2001 | Lombardo | B42D 5/025 493/188 |
| 6,391,404 B1 * | 5/2002 | Rosenbaum | A61J 1/05 428/35.2 |
| 6,719,678 B1 | 4/2004 | Stern | |
| 7,204,794 B2 * | 4/2007 | Rea | B29C 65/086 493/198 |
| 8,039,070 B1 | 10/2011 | Sawall et al. | |
| 8,230,664 B2 * | 7/2012 | Prizzi | B29C 59/007 493/212 |
| 8,281,839 B2 * | 10/2012 | Futase | B29C 65/38 156/502 |
| 8,360,306 B2 * | 1/2013 | Vroon | B65D 25/04 229/120.07 |
| 2002/0183181 A1 * | 12/2002 | Hayashi | B23K 26/0846 493/194 |
| 2003/0183346 A1 * | 10/2003 | Aarts | B29C 65/7894 156/583.1 |
| 2005/0044816 A1 | 3/2005 | Hanten | |
| 2009/0238502 A1 * | 9/2009 | Bhattacharjee | B65D 75/12 383/208 |
| 2010/0167893 A1 * | 7/2010 | Wilkerson | B31B 70/00 493/227 |
| 2012/0195526 A1 * | 8/2012 | Moehlenbrock | B65D 33/20 383/42 |
| 2012/0196731 A1 * | 8/2012 | Sargin | B65D 33/22 493/227 |
| 2013/0121623 A1 | 5/2013 | Lyzenga et al. | |
| 2013/0139473 A1 * | 6/2013 | Beer | B65D 31/10 53/452 |
| 2013/0224446 A1 | 8/2013 | Fayne et al. | |
| 2013/0251988 A1 * | 9/2013 | Cotton | C08K 3/26 428/347 |
| 2013/0330028 A1 * | 12/2013 | Bannister | B65D 31/00 383/123 |
| 2014/0079342 A1 * | 3/2014 | Kiiskinen | B65D 75/38 383/35 |
| 2014/0161373 A1 * | 6/2014 | Yeager | B65D 33/2533 383/42 |
| 2014/0206515 A1 | 7/2014 | Hanten | |
| 2014/0294326 A1 * | 10/2014 | Yeager | B65D 31/10 383/120 |
| 2014/0352259 A1 * | 12/2014 | Murray | B65B 9/2056 53/433 |
| 2015/0125099 A1 * | 5/2015 | Ishihara | B65D 75/008 383/120 |
| 2015/0126349 A1 * | 5/2015 | Ishihara | B65D 75/008 493/194 |

(56) References Cited

U.S. PATENT DOCUMENTS

2016/0067937 A1* 3/2016 Yeager ................ B29C 66/4722
  493/194
2016/0194116 A1* 7/2016 Yeager .................. B65D 31/10
  383/121
2016/0297568 A1* 10/2016 Yeager ................. B65B 61/188

FOREIGN PATENT DOCUMENTS

| IN | 1417DEL14 A | 6/2015 |
| JP | 2004292028 A | 10/2004 |
| WO | 2011018318 A1 | 2/2011 |
| WO | 2012099197 A1 | 7/2012 |

OTHER PUBLICATIONS

International Search Report and Written Opinion dated Dec. 15, 2016.
Supplemental Partial European Search Report dated Jun. 21, 2019.

\* cited by examiner

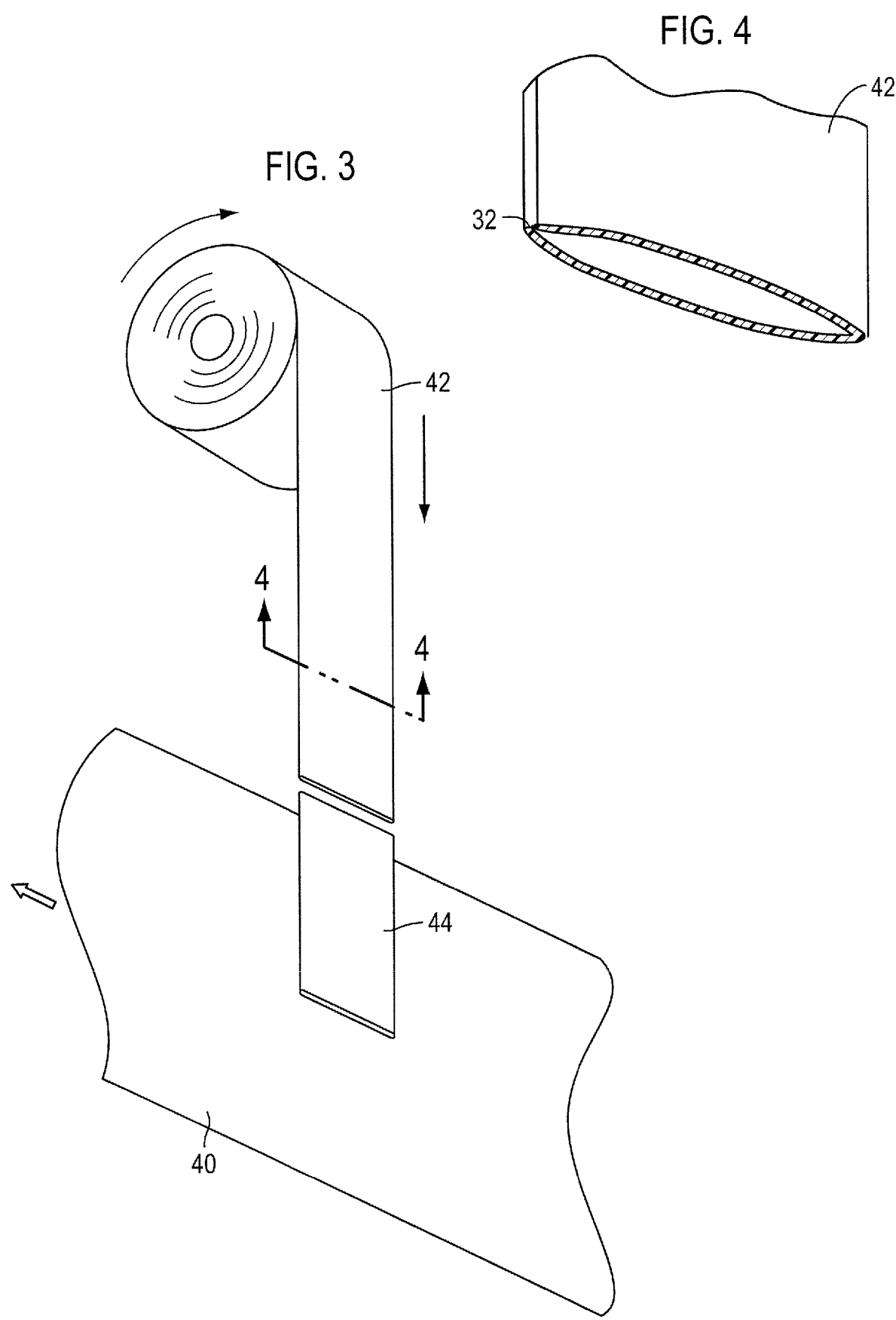

METHOD OF FORMING A BONDED PACKAGE GUSSET

CROSS-REFERENCE TO RELATED APPLICATIONS

This is a non-provisional application claiming priority to U.S. Provisional Ser. No. 62/213,449, filed on Sep. 2, 2015, which is hereby incorporated by reference in its entirety.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates generally to formation of gusseted packages from heat-sealable, polymeric film material, and more particularly to a method of making a package gusset having a bonded edge, which may comprise a frangible seal, to facilitate formation of a bottom-gusseted package for use with an associated form, fill and sealing packaging apparatus.

BACKGROUND OF THE INVENTION

Packages formed from plastic, polymeric film material have found widespread application in the market place for convenient and efficient packaging of all manner of food and non-food products. Packages of this nature typically are formed by folding and sealing a web of polymeric material to form a package body having front and rear package panels, with the package panels joined to each other at margins thereof. Depending upon the method of formation, the front and rear package panels may be joined to each other either by folded portions of the package body, or at seals (typically heat seals) joining the package panels to each other.

Efficient packaging of all manner of products and articles can be effected through use of a so-called form, fill and seal apparatus, which is configured to permit end-to-end formation of packages attendant to filling each package with the desired contents. U.S. Pat. No. 4,909,017, hereby incorporated by reference, illustrates an apparatus of this nature, showing the manner in which packaging are intermittently formed and advanced attendant to filling of each of the packages.

For many applications it is desirable to form a gusseted package, that is, providing the package with inwardly-extended, pleat-like gussets at one or more margins of the package body. One type of package which can advantageously facilitate retail display is sometimes referred to as a "stand up" or bottom-gusseted package, that is, a package having an inwardly extending gusset at the bottom of the package body. By virtue of the gusset provided at the bottom of the package, the package to be readily displayed in an upstanding or self-standing orientation for promoting efficient display for consumer selection from a store shelf or other display area.

US Patent Publications No. 2014/0161373, and No. 2014/0294326, both of which are hereby incorporated by reference, disclose a particularly efficient method for forming a bottom-gusseted package, by which technique a bottom gusset for each package is positioned transversely of a longitudinal axis of a web of material from which the package is formed. Notably, this formation method facilitates bottom gusset package formation in conjunction with a form, fill and seal apparatus to promote cost-effective and versatile use of bottom-gusseted, stand-up packages.

Experience has shown that attendant to package formation in accordance with the above-referenced patent publications, it can be desirable to provide an arrangement by which a sleeve from which each package gusset is formed is maintained in a generally closed or folded configuration during package formation and filling. In particular, each package gusset is formed from a web of material comprising a lamination, such as a co-extrusion, of two different polymeric materials which exhibit differing heat-sealing characteristics. Gusset formation is effected by folding and cutting the web of material to provide individual sleeves which form the bottom gusset of each respective package. To facilitate package formation, each sleeve, and ultimately each gusset, includes a non-heating surface at the interior of the gusset to permit the gusset to splay or open, while the exterior surface is subject to heat-sealing, thus facilitating package formation and filling such as in conjunction with a form, fill and seal apparatus.

The present invention is directed to a method of forming individual sleeves each having an exterior surface that can be heat-sealed for forming the bottom gusset of a package, while each sleeve is temporarily maintained in a closed configuration during package formation. Thereafter, attendant to package formation and filling, the sleeve which provides the bottom gusset is readily opened or splayed apart so that the package has the desired stand-up configuration.

SUMMARY OF THE INVENTION

The present invention is directed to a method forming a bottom-gusseted package, wherein each package includes an inwardly-extending, pleat-like gusset at the bottom of the package. To permit heat-sealing formation of each package, the sleeve from which each gusset is formed comprises a lamination of two differing polymeric materials, so that only an exterior surface of each sleeve exhibits the desired heat-sealing characteristics.

Notably, in order to facilitate package formation, the sleeves from which the bottom gussets are formed are maintained in a temporarily closed or sealed configuration during package formation by providing a bond or seal at the edge of each sleeve. Because it is presently preferred that the seal at the edge is frangible, each gusset can be readily opened and spread apart attendant to package filling, so that each package can be self-standing. This result is preferably achieved by folding the laminate material, and temporarily sealing or joining an outer layer of the laminate material from which gusset is formed, while an inner layer is maintained in an unsealed condition.

Attendant to formation of bottom-gusseted packages, the bonded edge of the sleeve can be positioned such that the bonded edge of the sleeve is positioned at the top of an adjacent one of the packages. When the packages are cut and separated after filling, the bonded edge portion is cut from the remainder of the sleeve, which thereby permits the bottom gusset can open as intended.

In accordance with the present invention, a method of forming a tube of polymeric material, comprising the steps of providing a web of polymeric material comprising a lamination of a support layer and a sealant layer having differing heat-sealing characteristics, and folding the web of polymeric material to position the support layer at an inside surface thereof to form a folded web. The web of polymeric material may comprise a co-extrusion of inner support and outer sealant layers.

In one aspect of the present invention, the present method includes cutting and heat-sealing folded web to form a tube, including applying heat to the folded web so that the sealant layer seals to itself to provide a bond for the tube, without heat-sealing of said support layer to itself. The cutting and sealing can be effected substantially simultaneously by applying a heated knife to the folded web, to thereby form the tube of polymeric material, and separate a scrap portion of the web from the tube. Alternatively, cutting and sealing can include at least one of: (1) applying a laser to the folded web to form the bond; and (2) ultrasonically bonding the folded web to form the bond. It is presently preferred to effect cooling or chilling of the folded web in conjunction with the heat-sealing step in order to limit and minimize distortion of the web and to form a bond of consistent dimension.

In a particularly preferred embodiment, the heated knife comprises a cutting edge defining a single bevel surface on one side thereof, with the bevel surface being oriented toward the scrap portion of the web. This preferred orientation has the desirable effect of pushing or diverting the scrap portion away from the tube being formed while the edge of the sealing tube is not diverted away from the cutting blade.

Another aspect of the present method contemplates forming a bond substantially along the length of the folded web, spaced from and parallel to the folded edge of the web, with the sealant layer on the exterior of the tube and the support layer on the interior of the tube. Bonding can include at least one of: (1) heat-bonding; (2) adhesive bonding; (3) cold blocking; and (4) solvent bonding. Heat-bonding may comprise at least one of hot-air bonding and laser bonding.

A method of forming a bottom-gusseted package in accordance with the present invention comprises the further steps of providing a flexible web of material having a longitudinal axis, and cutting the folded tube, which has been temporarily sealed, into a plurality of individual sleeves. The individual sleeves are then joined to the flexible web in spaced apart relationship longitudinally of the flexible web, with the spacing between the individual sleeves corresponding to the length of each of the bottom-gusseted packages being formed.

Package formation is further effected by folding the flexible web of material and joining the lateral margins thereof to form a folded flexible web, and to thereby form a package body for each of the bottom-gusseted packages. Each package body includes a front package panel and a rear package panel joined at opposite side margins thereof, with the individual sleeves being positioned generally within folded flexible web. Finally, the folded flexible web is cut at intervals each corresponding in length to the length of each of the bottom-gusseted packages so each individual sleeve provides a bottom gusset for one of the packages being formed.

In accordance with the present invention, package formation can be completed by opening the temporary bond or seal formed in the individual sleeves cut from folded web for opening the bottom gusset of each of the packages.

Attendant to package formation, normal manufacturing tolerances can result in at least some of the gusset-forming sleeves extending between or spanning adjacent ones of the packages. During cutting of the flexible web, such sleeves can be simultaneously cut to thereby form a top sleeve portion in adjacent one to the packages, with this sleeve portion including the bond formed in the tube of material from which the sleeves are formed.

Other features and advantages of the present invention will be readily apparent from the following detailed description, the accompanying drawings, and the appended claims.

BRIEF DESCRIPTION OF THE DRAWINGS

FIG. 3 is a diagrammatic view illustrating formation tubular sleeve of material for formation of bottom gusset in the package shown in FIGS. 1 and 2, in accordance with the present invention;

FIG. 4 is a cross-sectional view taken generally along lines 4-4 of FIG. 3;

DETAILED DESCRIPTION OF THE PREFERRED EMBODIMENT

Figure 1:
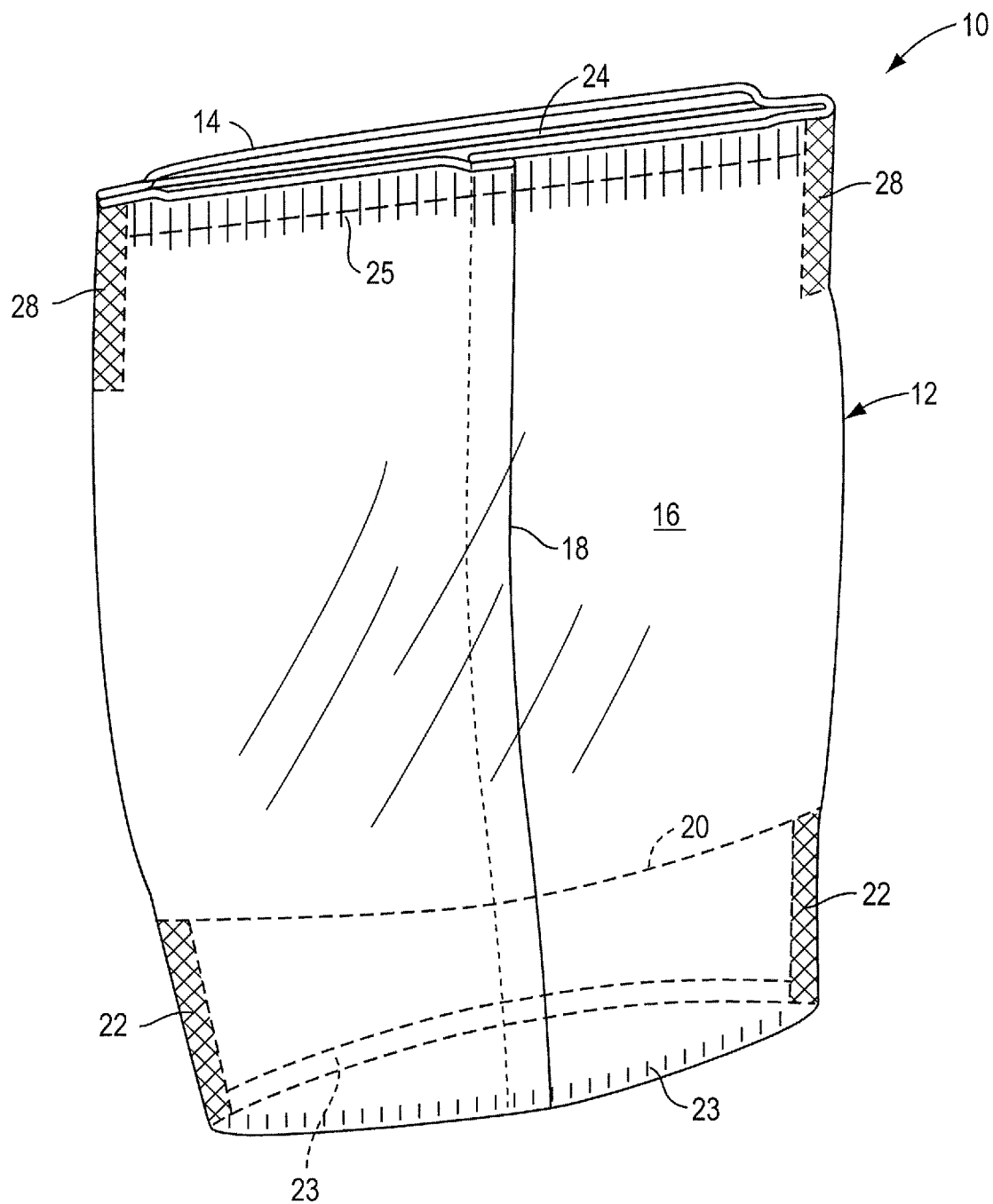
FIG. 1 is a perspective view of a bottom-gusseted package configured in accordance with the present invention.

While the present invention is susceptible to embodiment in various forms, there is shown in the drawings and will hereinafter be described presently preferred embodiments, with the understanding that the present disclosure is to be considered an exemplification of the invention, and is not intended limit the invention to the specific embodiments illustrated.

The present invention is directed to a method forming a bottom-gusseted package, wherein each package includes an inwardly-extending, pleat-like gusset at the bottom of the package. To permit heat-sealing formation of each package, each gusset is formed from a lamination of two differing polymeric materials, so that only an exterior surface of each gusset exhibits the desired heat-sealing characteristics. Notably, in order to facilitate package formation, the sleeves from which the bottom gussets are formed are maintained in a temporarily closed or sealed configuration during package formation, with each gusset being readily opened and spread apart attendant to package filling, so that each package can be self-standing. This result is preferably achieved by folding the laminate material, and temporarily sealing or joining an outer layer of a laminate material from which gusset is formed.

Figure 2:
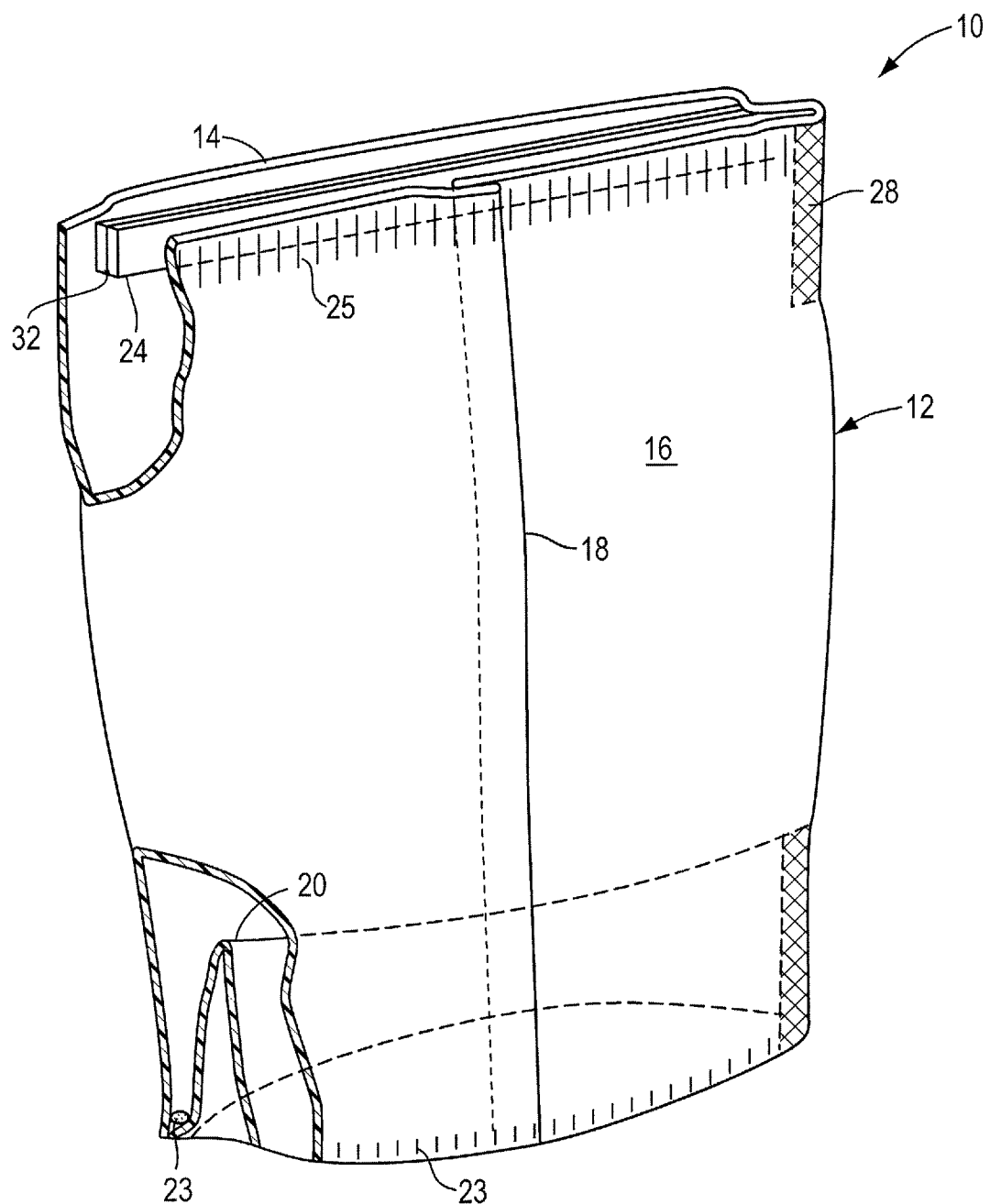
FIG. 2 is a perspective view, partially cut away, of the embodiment of the bottom-gusseted package shown in FIG. 1.

With reference first to FIGS. 1 and 2, therein is illustrated a bottom-gusseted package 10 embodying the principles of the present invention. As will be further described, bottom-gusseted package 10 is configured to facilitate formation and filling on an associated, so-called form, fill and seal packaging machine, as is known in the art. Typically, the present invention can be practiced by partial formation of the present package as a rolled web of flexible, polymeric film material, with individual sleeves positioned thereon, which is supplied to the form, fill and seal apparatus. The formation of each package is completed attendant to filling of each of the packages with the desired quantity of product.

Package 10 is formed by joining a plurality of individual sleeves to an associated web of flexible material, in spaced apart relationship along the longitudinal axis of the flexible web. Attendant to package formation, each individual sleeve can be cut as individual packages are formed, with each individual sleeve providing a bottom gusset 20. Package 10 includes a bottom gusset 20 which is positioned between the front and rear package panels 14 and 16, and which extends upwardly and inwardly from lower edges of the front and rear package panels. As will be further described, the pleat-like bottom gusset 20 is formed from a sleeve of material which is positioned within the flexible web from which the package body is formed, with the sleeve of material in some instances cut attendant to formation of individual packages.

The bottom gusset 20 is joined to and integrated with the package body by a pair of side seals 22 at opposite lateral margins of the package body, and a pair of end seals 23 which respectively join the edges of the bottom gusset 20 to the front and rear package panels 14 and 16. The bottom gusset 20 can be configured to have a width less than that of the package 10, which permits the formation of side seals to join the front and rear package panels to each other. This permits the formation of a stable and self-standing package, by closing the opposite ends of the bottom gusset. This can be desirable since the inwardly facing surfaces of the bottom gusset ordinarily do not heat-seal to each other.

The package 10 may include a top sleeve portion 24 positioned between the front and rear package panels 14 and 16, at the upper end of the package body 12. The top sleeve portion 24 is joined to and integrated with the package body 12 by side seals 28 joining respective opposite ends of the sleeve portion 24 to the package body generally at opposite, lateral side margins thereof. A pair of top seals 25 respectively join the pair of legs or flanges of the top sleeve portion 24 to the front and rear package panels 14, 16. As will be further described, the top sleeve portion 24 can be formed attendant to package formation and filling, as the packages are cut and separated. This cutting can act to simultaneously cut the sleeve within the package body which forms bottom gusset, so that the cut portion provides the top sleeve portion 24 in an adjacent one of the packages.

Access to the contents of package 10 can be made via the top sleeve portion 24, which may be provided with a recloseable fastener and/or a temporary, so-called "peal seal" between the legs or flanges of the top sleeve portion. Other arrangements can be provided for accessing the package contents, or the package may be cut open such a with scissors or the like.

For package formation, a flexible web 40 preferably comprising heat-sealable polymeric material is provided, with a flexible web typically advanced in a direction along its longitudinal axis. Formation of the present bottom-gusseted package is further effected by providing a flexible, sleeve-forming web 42, also preferably comprising suitable polymeric, heat-sealable material. The composition of the sleeve-forming web can differ from the flexible web 40 for forming the package of the body, as may be desired. In accordance with the present invention, the sleeve-forming web comprises a web of polymeric material comprising a support layer and a sealant layer having differing heat-sealing characteristics.

It is presently contemplated that only one side of the sleeve-forming web exhibit heat-sealing characteristics so that it can heat-sealed to the flexible web 40. In contrast, the other side of the sleeve-forming may be non-heat-sealable, or exhibit heat-sealing characteristics that otherwise differ from the heat-sealing characteristics of the first side. It is thus contemplated that the inside surface of the folded, sleeve-forming web does not heat seal to itself. This permits the eventual opening and spreading of the legs of the bottom gusset 20 so that the package 10 can assume a generally self-standing orientation.

As shown on FIG. 4, the sleeve-forming web 42 is folded to provide a tubular configuration, including a sleeve bond 32 joining lateral edges of the sleeve-forming web, as will be further described. Sleeve bond 32 is preferably formed substantially along the length of the folded web 42, spaced from and parallel to the folded edge of the web, with the sealant layer on an exterior of the tube, and the support layer on interior of the tube. While it is presently preferred that the sleeve bond 32 be substantially continuous, it is within the purview of the present invention to form sleeve bond 32 in a discontinuous configuration, such a comprising a plurality of spaced, cooperating individual seals.

As further illustrated, individual sleeves 44 are cut from the sleeve-forming web 42, and are positioned transversely of the longitudinal axis of the flexible web 40 from which the package body is formed. For some applications, it can be desirable to seal the ends of each individual sleeve 44, such as with suitable adhesive. The individual sleeves 44 are joined to the flexible web 40 in spaced apart relationship longitudinally of the web 40. The spacing between the individual sleeves 44 corresponds to the length of each of the bottom-gusseted packages 10 being formed.

Figure 5:
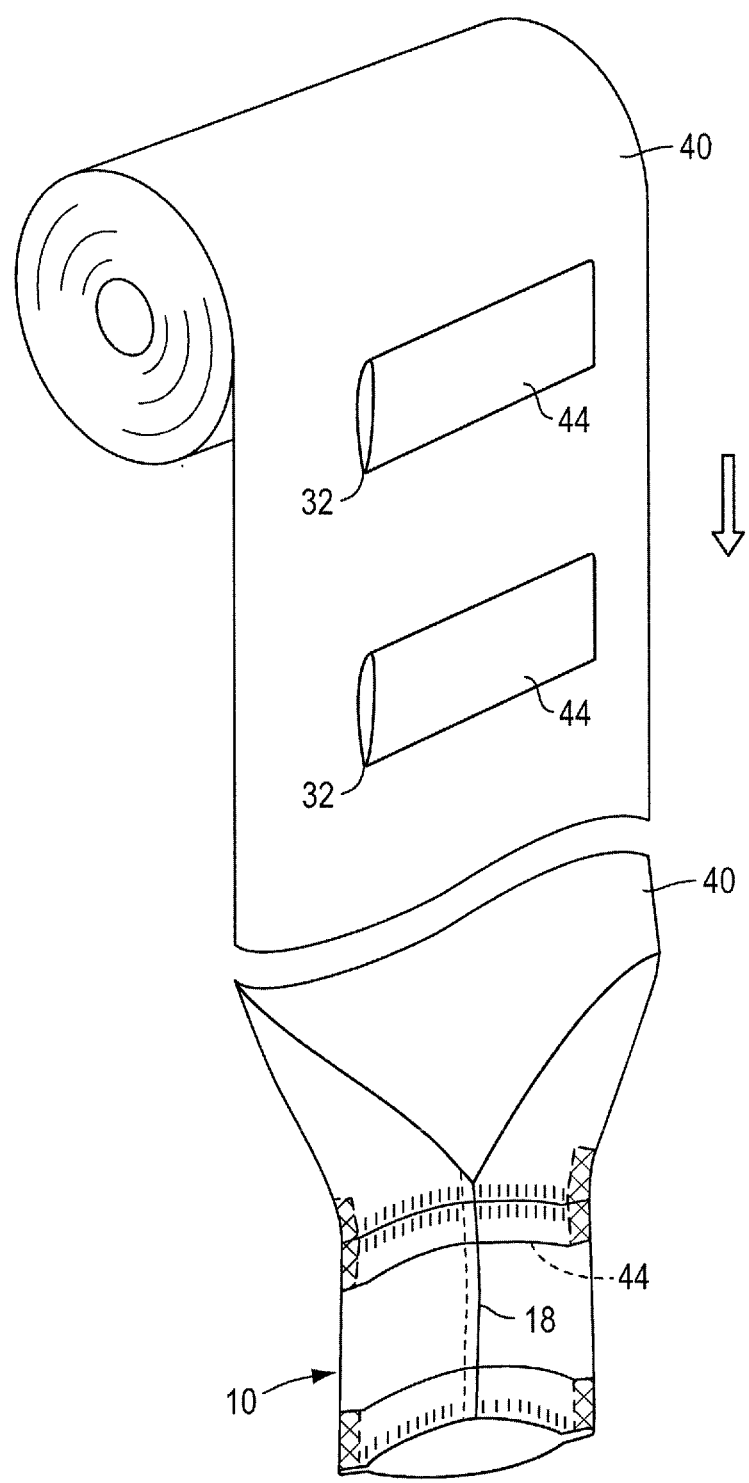
FIG. 5 is a diagrammatic view further illustrating formation of a recloseable, bottom-gusseted package.
Figure 6:
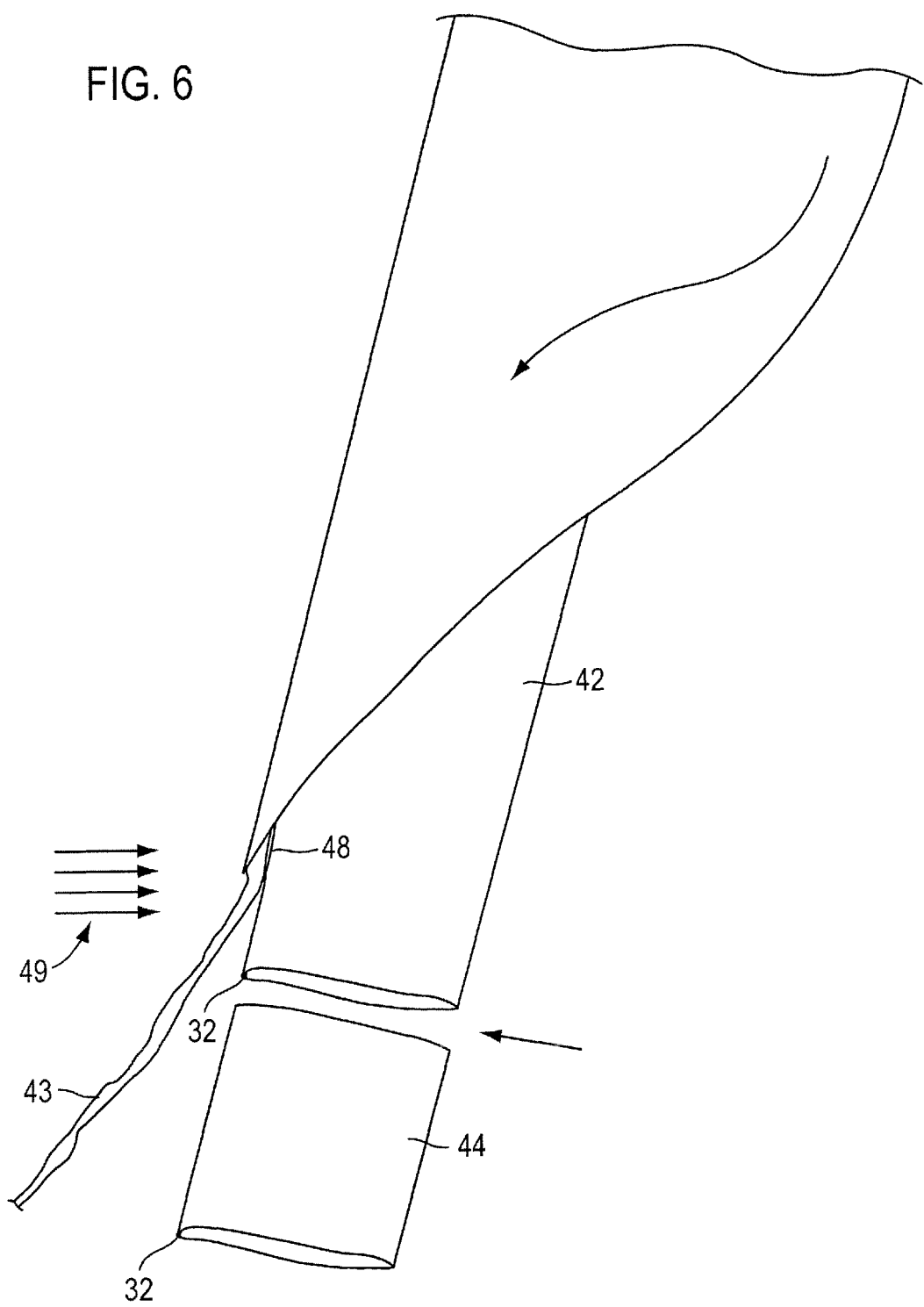
FIG. 6 is diagrammatic view of a method of making a tubular sleeve in accordance with the present invention.

After each of the individual sleeves 44 is joined to the flexible web 40, the flexible web is folded and the lateral margins thereof joined together to form a folded flexible web (see FIGS. 5 and 6). In this way, a package body is formed for each of the bottom-gusseted packages. By folding of the flexible web 40, the front and rear package panels 14 and 16 of each package are formed. The folded flexible web 40 can be joined to itself so as to form bag seam 18, with the front and rear package panels joined to each other at the folded, lateral margins of the folded web. As illustrated, the individual sleeves 44 are positioned within the folded flexible web 40.

The present invention contemplates that each individual sleeve 44 can be positioned to span and extend between two adjacent ones of the packages being formed, with subsequent cutting transversely of the longitudinal axis to form individual packages, including cutting through each sleeve portion 44 to form a bottom gusset 20 for one package, and a top sleeve portion 24 for an adjacent package. It is presently contemplated that formation in this manner can be effected, if desired, during packaging on a form, fill, and seal apparatus, or that individual packages can be formed for subsequent filling. Depending upon the specific formation technique, side seals 22 and 28 are typically formed prior to filling, with one of end seals 23, 25 formed after the contents of each package have been positioned therein. As will be appreciated, the sleeve bond 32 formed when sleeve-forming web 42 is formed into a tube will be included in the top sleeve portion 24. However, if the sleeve bond 32 is not positioned in the top sleeve portion 24 of the adjacent package, either by design or resulting from normal manufacturing tolerances, the frangible nature of the sleeve bond permits it to break and open, thereby permitting the designed opening of the bottom gusset of the package.

In accordance with the present invention, a method of forming sleeves 44 for formation of gussets 20 in the packages 10 will now be described. Notably, in the preferred practice, this aspect of the present invention contemplates that attendant to formation of sleeves 44, the web 42 of sleeve-making material is folded, and then substantially simultaneously cut and sealed to form the sleeve bond or seal 32 as a temporary, frangible seal along one edge of each sleeve 44, opposite the folded edge thereof.

As noted, it is contemplated that each sleeve 44 have an outer surface which is heat-sealable to the associated package-forming web 40, while the inner surface of each sleeve is not heat-sealed to permit the desired opening of each resultant gusset 20. In order to provide the preferred, frangible, temporary seal for each sleeve 44, and the resultant gusset 20, the present invention contemplates that the outer, heat-sealable surface of each sleeve is heat-sealed and bonded to itself, opposite the folded edge of each sleeve. By virtue of the differing heat-sealing characteristics of the inner and outer surfaces of each sleeve 44, the edges of the inner surface are not heat-sealed to each other, while the sleeve bond 32 formed between the edges of the outer surface forms the desired frangible seal.

Figure 7:
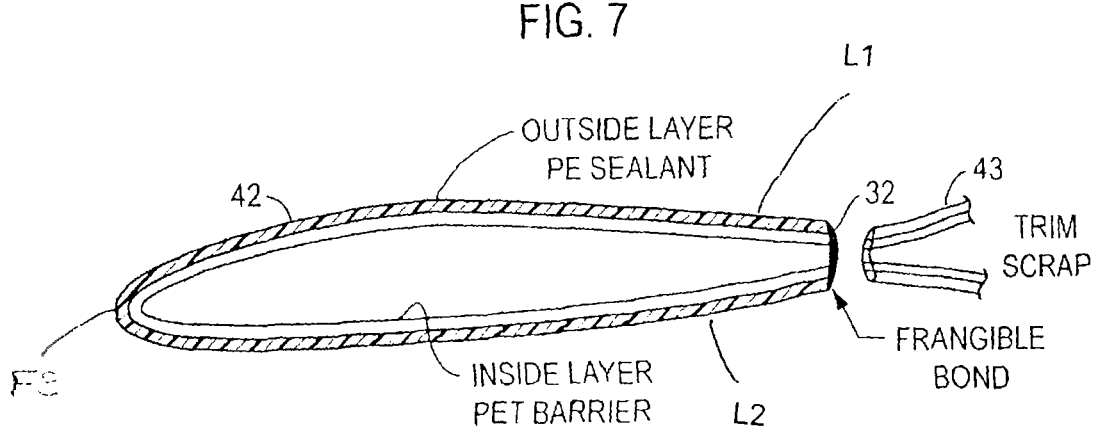
FIG. 7 is a diagrammatic view further illustrating formation of a tubular sleeve in accordance with the present invention.
Figure 8:
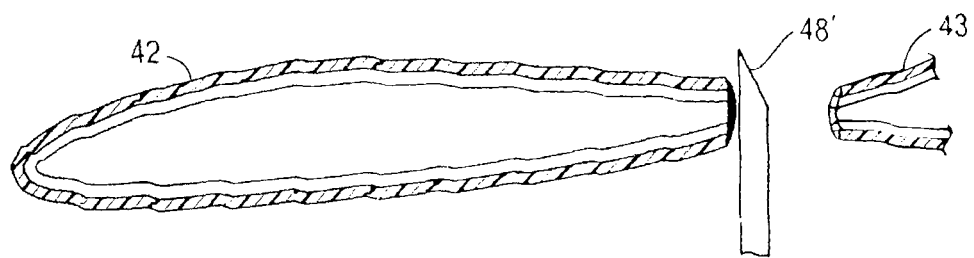
FIG. 8 is a diagrammatic view illustrating cutting of a tubular sleeve in accordance with the present invention.

As shown in FIG. 5, the folded sleeve-forming web 42 from which sleeves 44 are cut is formed from a polymeric web in the form of a lamination, such as a co-extrusion, of differing polymeric materials exhibiting differing heat-sealing characteristics. In particular, the web 42 can include an inner, support layer such as polyethylene terephthalate (PET), and an outer sealant layer, such as comprising heat-sealable polyethylene (PE). As seen in FIGS. 7 and 8, the folded web 42 has a "U" shape with a folded edge FE, and first and second legs L1, L2 projecting away from the folded edge so that the support layer on each of the legs L1, L2 faces, the support layer on the other of the legs L1, L2. The present method contemplates providing the sleeve-making web 42 of such polymeric material, and folding the web to position the support layer at an inside surface thereof to form a folded web.

The present method further contemplates that in the preferred practice, the folded sleeve-forming web 42 is substantially simultaneously cut and heat-sealed to form a tube, including applying heat to the folded web so that the outer sealant layer seals to itself to provide a bond for the tube, without heat-sealing of the inner support layer to itself. In one form of the present invention, formation in this manner is effected by applying a heated knife 48 to the folded sleeve-forming web 42. Alternatively, it is within the purview of the present invention that the steps of applying heat to folded web and effecting cutting of the folded web can include at least one of: (1) applying a laser to the folded web; and (2) ultrasonically bonding the web. In accordance with the presently preferred practice of the invention, cutting of the overlapped edges of the folded web 42 results in generation of a scrap portion, designated 43.

Simultaneous sealing and cutting of polymeric webs, such as comprising low density polyethylene (LDPE) or co-extruded web has been known for many years and can be efficiently performed, such as in accordance with U.S. Pat. No. 4,687,532, hereby incorporated by reference. By way of example, it is commonly known to cut and seal a wide tube of blown film such as in connection with the grocery, tee-shirt, and trash bag markets. However, while this technique is common with heat-sealable PE based webs, cutting and sealing a laminate web structure is believed to be unique to the present invention, and is particularly suited for effecting formation of bottom-gusseted packages.

Common laminate structures include PET/PE, PA/PA (polyamide/polyamide), as well as other polymeric compositions. Typically, these structures include a sealant layer that is bonded through a tie layer, usually adhesive, to a support layer. Ordinarily, the support layer, such as PET, is not heat sealable to itself. As a consequence, if a laminate web is folded in such a manner that the PE or sealant layers are opposing each other a heat-seal bond can be obtained. However, if the laminate is folded in such a manner that the PET or support/barrier layers oppose each other, a heat seal bond is not possible. In general, heretofore laminate materials have not been simultaneously cut and sealed because of the non-sealant layers.

It is known to cut and seal a polymeric web by making a heat seal, such as on the order of ¼ inch in width, and thereafter use a separate slitting knife to cut the seal in half. Again, this is very common if the heat seal layers are bonded to each other, but ordinarily is not possible if the support layers are formed from non-heat sealable material, such as PET, because they will not bond to themselves with heat seals. Alternative methods of heat sealing can include ultrasonic or laser heat sealing, but again these techniques are not ordinarily used on laminate structures.

Significantly, the end result of the preferred practice of the present method is to substantially simultaneously cut and seal the laminate, sleeve-forming web 42, where the sleeve bond or seal 32 is a very small weld bead that forms from the two edges of plastic running over a heated knife blade. This technique creates a weld similar to the hot knife plastic bag welding methods well-known in the industry. An example would be a typical bread bag side-weld seal.

By cutting at a location spaced from the folded edge FE, a frangible bond bridges across the support layer and between the sealant layer on the legs L1, L2, as seen in FIG. 7.

Figure 9:
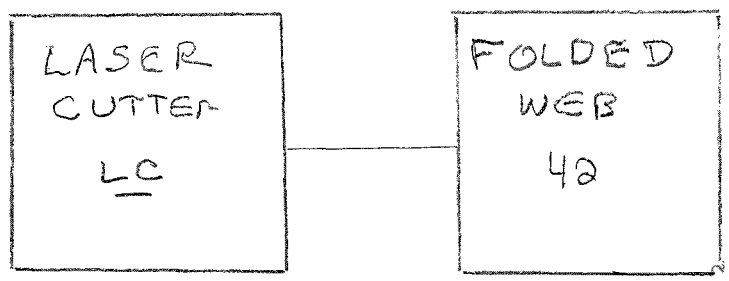
FIG. 9 is a schematic representation of a laser used to form a tubular sleeve according to the invention.

While use of heated knife 48 is presently preferred for effectively substantially simultaneous cutting and heat-sealing of the folded web 42, cutting and heat-sealing of the web may alternatively comprise at least one of: (1) applying a laser to the folded web to form the desired sleeve bond; and (2) ultrasonically bonding the folded web to form the bond. A laser cutter LC is shown schematically in FIG. 9.

To facilitate high-speed formation, and to promote uniformity and stability of the folded, bonded web 42, cooling of the web is preferably effected in conjunction with the cutting and heat-sealing, such as by directing cooling airflow 49 against the web, and/or employing cooled or chilled plates or like surfaces for effecting web cooling. The preferred cooling step in the region of the heat-sealing is important in this process to keep the film cool, and also to cool the sleeve seal 32 immediately after forming. Cooling the seal allows a uniform, small weld bead. Without cooling the seal will become ragged on the edges and excess heat in the area can also cause the film to wrinkle and deform from the heat.

The novelty of the current invention is to use a cutting and sealing method to create a tube from a laminated material that contains a barrier layer that is not heat-sealable to itself. The method involves unwinding the laminated, sleeve-forming web 42 from a roll and folding it in half using known methods so that the support layer, typically a barrier layer, is opposing itself on the inside of the folded web. The folded web is then run through a heated seal blade 48 to cut the web with a small amount of trim, i.e., a scrap portion 43, and seal the edges closed so that it forms a tube. The sleeve bond is thus formed spaced from and parallel to the folded edge of the web. It has been discovered that even though the inside, support layer of the lamination does not heat-seal to itself, there is enough melt and flow of the outer sealant layer to form a very small weld bead to provide sleeve bond 32 which is strong enough to temporarily hold the material together and form a tube. This method does not typically produce a strong seal that would be acceptable to hold product in a flexible packaging application, but it is strong enough to hold the material edges together in a tube for future processing, or winding on a roll, such as for eventual formation of a bottom-gusseted package.

The present method has the added benefit of making an accurate tube which is dimensionally consistent. It is very common when folding web materials in flexible packaging that, in some cases, the folded edges overlap each other and do not line up perfectly all the time. It is therefore common in the industry to slit the edges with a razor blade so that the finished package has evenly aligned edges. In the present method of forming a tube, the cutting and sealing process ensures that the edges are aligned because they are sealed together, and the finished size of the tube is not affected by misfolded edges which are trimmed off and separated as scrap portion 43.

In a particularly preferred embodiment, the heated knife comprises a cutting edge defining a single bevel surface 48' on one side thereof, with the bevel surface being oriented toward the scrap portion 43 of the web 42 (see FIG. 8). This preferred orientation has the desirable effect of pushing or diverting the scrap portion 43 away from the tube being formed while the edge of the sealing tube is not diverted away from the cutting blade.

Alternative methods of effecting bonding of the folded, sleeve-forming web 42 can advantageously be employed. Instead of the use of heated knife 48, bonding of the laminate web can be efficiently achieved through use of at least one of: (1) heat-bonding; (2) adhesive bonding; (3) cold-blocking; and (4) solvent bonding. Such heat-bonding can comprise at least one of hot-air bonding and laser bonding. As discussed above, heat-bonding can comprise substantially simultaneously cutting and heat-bonding the folded web by application of a heated knife.

Adhesive can be applied to the inner layers of the folded web 42, and therefore bond the layers together. However, adhesive is a consumable and therefore expensive, and its use can undesirably add extra cost and complexity to the forming of a tube from laminated materials. As noted, another bonding method is solvent welding, which is similar to adhesive in that it will make a wide seal, but that may not as desirable for efficient package formation, and is a consumable that adds cost and complexity to the formation process.

The present invention thus contemplates a method for forming a tube of laminate material with a bonded or sealed edge, which can be frangible. This is important for a product such as a bottom-gusseted package, as described above. This technique for formation of a bottom gusseted package requires that the inside layer of the gusset does not heat seal to itself, yet must have a sealant layer to bond to the base film of the package to be formed. The bottom gussets are pre-applied to the base web and must remain intact on the web to allow winding into a roll and further processing on the form, fill, and seal machine. If the gussets are not closed into a tube, experience has shown that they may unfold on the rolls, or crash into the filling tube on the form, fill, and seal machine.

The present invention solves those issues by providing a method to form a tube with a sealed edge from laminate materials, and which is thus particularly suited for formation of a bottom-gusseted package, as disclosed above. The frangible sleeve seal 32 is desirable in that after the package 10 is formed it can be broken apart to allow the weight of the product to open the bottom gusset 20. However, the sleeve seal 32 can also be placed into the top sleeve portion 24 of the next, adjacent package, so it is not necessary to be a frangible seal, but it still is desirable. The very small weld bead (approx. $\frac{1}{32}$") is much better than a $\frac{1}{4}$' wide glue seal, as might otherwise be used to close the sleeves 44. The desirably small sleeve bond or seal 32 precludes the need for an excessively large portion of the sleeve 44 to form a top sleeve portion 24 of an adjacent package while ensuring that the bottom gusset 20 will open as intended.

From the foregoing description, it will be appreciated that the method steps include:

1. Unwind roll of laminate film material 42;
2. Fold the film material 42 in half such that the barrier layers face each other on the inside of the web;
3. Run the edge through a hot knife sealer 48 to form a very narrow frangible seal 32 for tube of laminate material;
4. Feed the tube created into an applicator to heat seal the leading edge to the base web of film;
5. Wind up the pre-applied tubes so that a roll is formed for later processing on FFS machine.

The benefits derived from practice of the present invention will be readily appreciated. Heretofore, simultaneous cutting and sealing of a laminate material, where the inner layers do not heat seal to themselves, has not been contemplated. The preferred sealing method desirably creates a very small seal bead which improves the functionality of the gusseted-package forming process. Because the seal 32 is preferably frangible, the bottom gusset will still open as intended, even in the event that cutting of package is effected such that the seal 32 does not form part of top sleeve portion 24, since the seal 32 will break thus permitting the desired opening of the bottom gusset 20 when product is loaded in the package. The present method is economical, and in the preferred practice does not require an additional consumable material.

In is within the purview of the present invention to formed the sealed tube 42, and thereafter wind the sealed tube onto a roll which can then later be used on an existing transverse direction applicator, without the need for adding heat sealing equipment to the applicator. In this way, a single tube-forming arrangement could then feed multiple applicators.

Typically, once the sleeve 44 is formed, it is applied transverse to the web 40 with a vacuum belt transfer to a heat seal bar. The sleeve 44 is then welded or heat-sealed to one side of the base web 40. Since the inner layer of the sleeve does not heat seal to itself, the frangible seal 32 on the open edge prevents the otherwise the folded gusset from just falling down.

Experience has shown that for some applications, it can further be desirable to form frangible seals on the ends of each sleeve 44 cut from the web 42. This can be effected in a manner similar to above-described use of heated knife 48, such as by use of a heated cross-cut knife for cutting the sleeves 44 from the folded web 42. This can be desirable to prevent the sleeve from falling down and flipping over prior to winding on a roll. In some instances, the "memory" of the web, after folding to a tubular configuration, can cause the folded sleeve to spring open. The solution for this was to is weld at least the longitudinal edges of the cut off sleeve. This has proven to be an important feature in some applications.

From the foregoing, it will be observed that numerous modifications and variations can be effected without departing from the true spirit and scope of the present invention.

It is to be understood that no limitation with respect to the specific embodiments disclosed herein is intended or should be inferred. The disclosure is intended to cover by the appended claims all such modifications as fall within the scope of the claims.

The invention claimed is:

1. A method of forming a tube, comprising the steps of:
providing a web of polymeric material comprising a lamination of a support layer and a sealant layer having differing heat-sealing characteristics;
folding said web of polymeric material to form a folded web having a shape of a "U" with a folded edge and first and second legs projecting away from the folded edge with the support layer on each of the first and second legs facing the support layer on the other of the first and second legs; and
cutting and heat-sealing said folded web to form a tube, including applying heat to said first and second legs on said folded web as the folded web is being cut at a location spaced from the folded edge so that said sealant layer produces a frangible bond that bridges between the sealant layer, and across the support layer, on the first and second legs without heat-sealing of said support layer to itself.

2. A method of forming a tube in accordance with claim 1, wherein said web of polymeric material comprises a co-extrusion of said support and sealant layers.

3. A method of forming a tube in accordance with claim 1, wherein said step of cutting and heat-sealing said folded web comprises applying a heated knife to said folded web, to thereby form said tube and to separate a scrap portion of said folded web from said tube.

4. A method of forming a tube in accordance with claim 3, including cooling said folded web in conjunction with said step of cutting and heat-sealing said folded web.

5. A method of forming a tube of in accordance with claim 3, wherein said heated knife comprises a cutting edge defining a single bevel surface on one side thereof, said bevel surface being oriented toward said scrap portion of said folded web.

6. A method of forming a tube in accordance with claim 1, wherein said step of cutting and heat-sealing includes applying a laser to said folded web to form said frangible bond.

7. A method of forming a tube in accordance with claim 1, including:
providing a flexible web of material having a longitudinal axis;
cutting said folded tube into a plurality of individual sleeves;
joining said individual sleeves to said flexible web in spaced apart relationship longitudinally of said flexible web, with the spacing between said individual sleeves corresponding to a length of each of a plurality of bottom-gusseted packages being formed;
folding said flexible web of material and joining lateral margins thereof to form a folded flexible web, and to thereby form a package body for each of said bottom-gusseted packages,
each package body including a front package panel and a rear package panel joined at opposite side margins thereof, said individual sleeves being positioned substantially within said folded flexible web; and
cutting said folded flexible web at intervals each corresponding in length to said length of each of said bottom-gusseted packages so each individual sleeve provides a bottom gusset for one of the packages being formed.

8. A method of forming a tube in accordance with claim 7, including opening said frangible bond formed in the individual sleeves cut from said folded web for opening the bottom gusset of each of said packages.

9. A method of forming a tube in accordance with claim 7, wherein said step of cutting said folded flexible web includes cutting at least some of said individual sleeves to form a top sleeve portion having said frangible bond in an adjacent one of said packages.

* * * * *